United States Patent [19]
Ushijima

[11] 3,797,330
[45] Mar. 19, 1974

[54] CONTROL SYSTEM FOR AUTOMATIC TRANSMISSION FOR VEHICLES

[75] Inventor: Fmihiro Ushijima, Toyota, Japan

[73] Assignee: Toyota Jidosha Kogya Kabushiki Kaisha, Toyotacho, Toyota-shi, Japan

[22] Filed: Sept. 23, 1971

[21] Appl. No.: 183,044

[30] Foreign Application Priority Data
Dec. 1, 1970   Japan.............................. 45-106600

[52] U.S. Cl. ................................. 74/752 A, 74/866
[51] Int. Cl. ........................ B60k 21/00, F16h 3/74
[58] Field of Search... 74/866, 757 A, 752 B, 752 C

[56] References Cited
UNITED STATES PATENTS

| | | | |
|---|---|---|---|
| 3,448,640 | 6/1969 | Nelson | 74/866 |
| 3,267,762 | 8/1966 | Reval | 74/866 X |
| 3,487,725 | 1/1970 | Bruxot | 74/752 A |
| 3,628,642 | 12/1971 | Ravenel | 74/752 Q |

Primary Examiner—Arthur T. McKeon
Attorney, Agent, or Firm—Cushman, Darby & Cushman

[57] ABSTRACT

A control system for an automatic transmission which does not employ a manual valve having a plurality of positions for providing communication between fluid passages, but employs a plurality of solenoid operated shift control valves each having two positions electrically changed over. In the control system, various speed ratios are established by a variety of combinations of the positions of the shift control valves and an electrical switch is changed over to one of a plurality of positions by a shift lever to control the current supplied to the solenoids of the solenoid operated shift control valves. Thus, electrical wiring is solely required for functionally connecting the automatic transmission with the shift lever.

13 Claims, 19 Drawing Figures

PATENTED MAR 19 1974 3,797,330

INVENTOR

Fuihiro
USHIJIMA

BY
Cushman, Darby & Cushman
ATTORNEYS

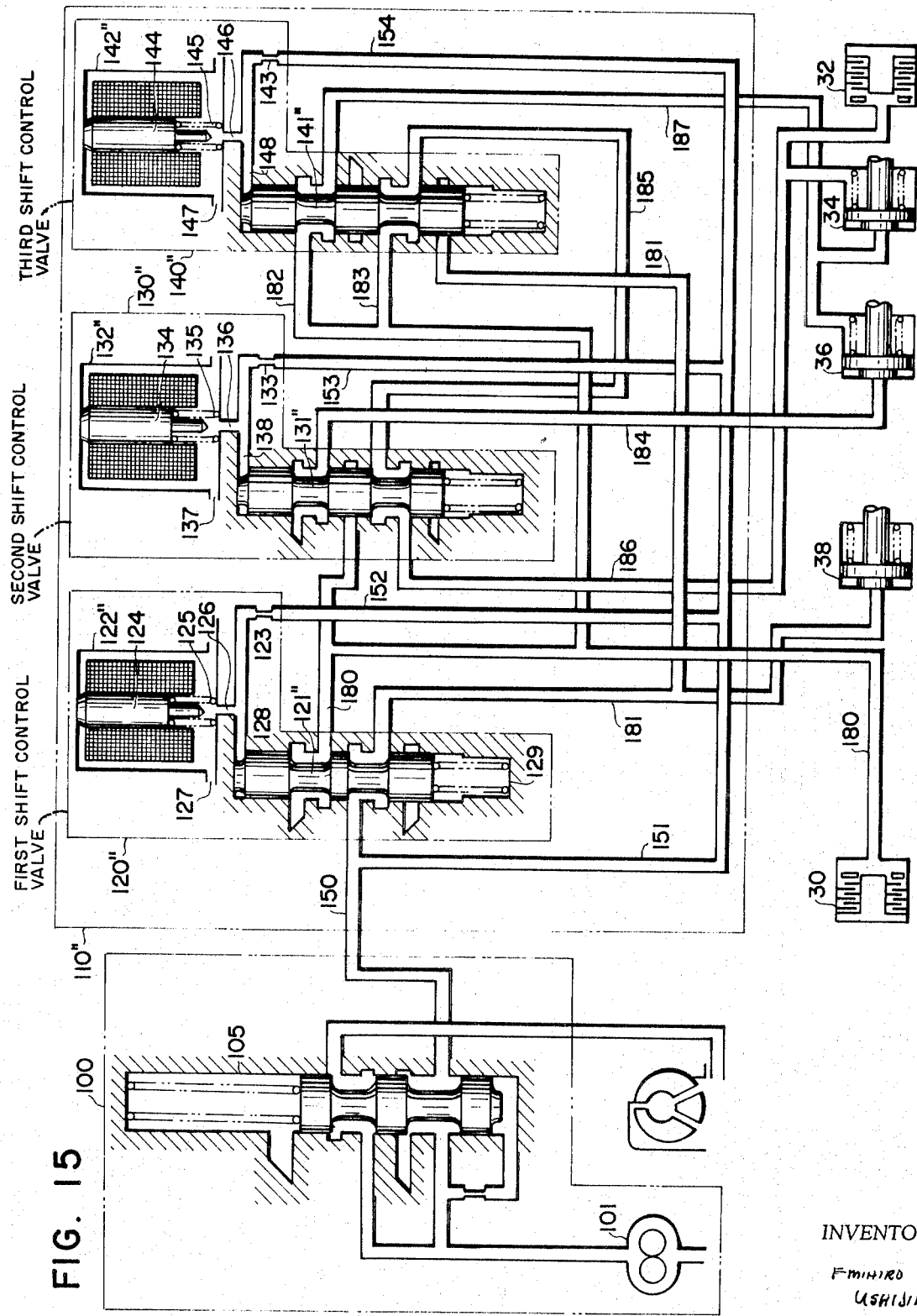

INVENTOR.
Fumihiro USHIJIMA

BY
ATTORNEYS

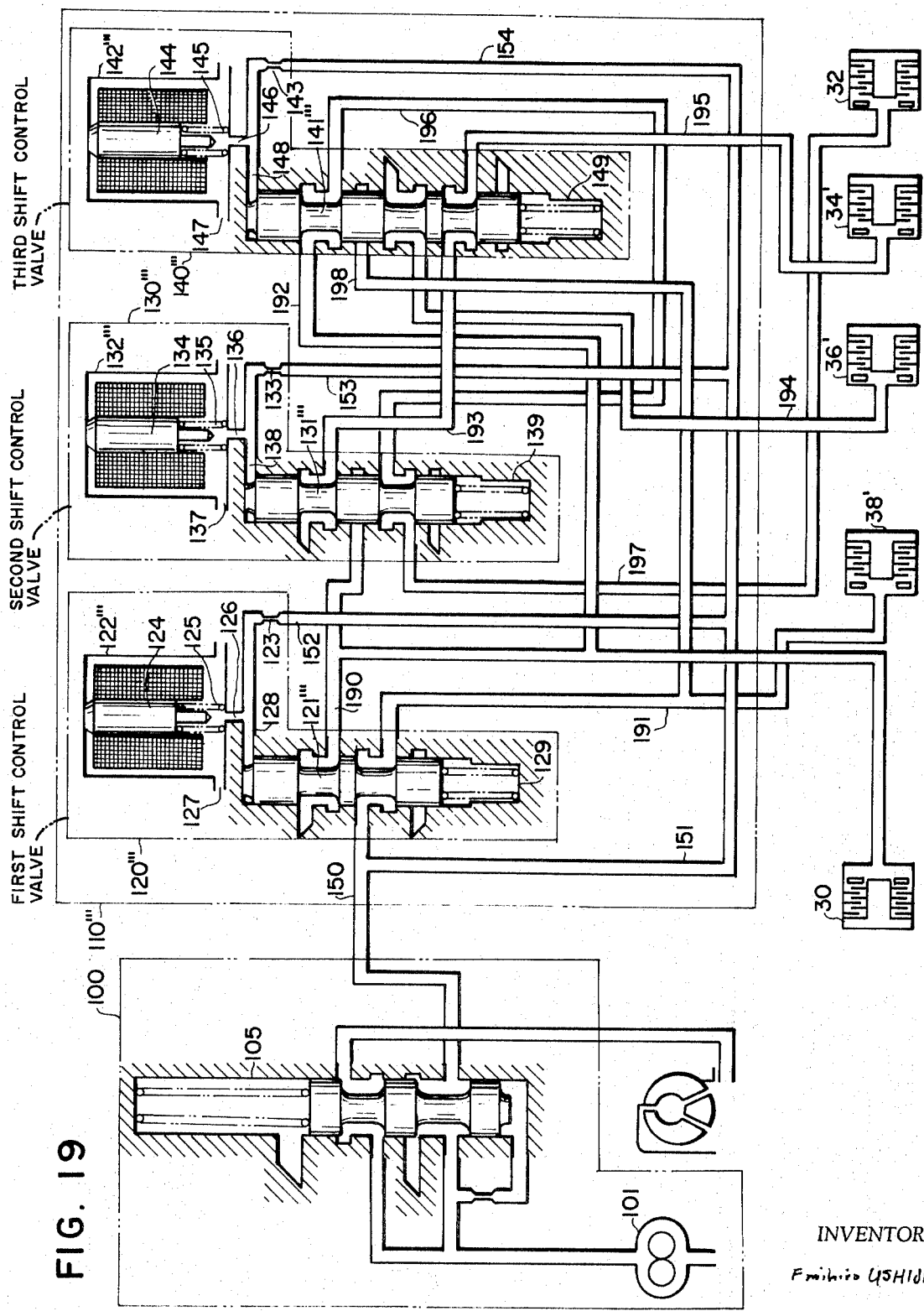

CONTROL SYSTEM FOR AUTOMATIC TRANSMISSION FOR VEHICLES

BACKGROUND OF THE INVENTION

1. FIELD OF THE INVENTION

This invention relates to shift control systems for automatic transmissions for automotive vehicles and more particularly to a combined hydraulic and electrical shift control system for a fluid controlled automatic transmission in which various speed ratios are established by fluid pressure operated servo means and fluid under pressure supplied to these fluid pressure operated servo means is controlled electrically.

2. DESCRIPTION OF THE PRIOR ART

Automatic transmissions for vehicles are generally provided with manual shift control means responsive to the manipulation of a shift lever by the driver and automatic shift control means responsive to the driving conditions of the vehicle. Heretofore, manual shift control has been carried out by the manipulation of a shift lever which is disposed adjacent to the driver's seat in the vehicle compartment and is mechanically connected through means such as a linkage to a so-called manual valve disposed in the automatic transmission and having a plurality of positions for providing communication between different fluid passages so as to selectively supply fluid under pressure to fluid pressure operated servo means associated with frictional engaging means such as multiple disc clutches and brake bands. However, the conventional manual shift control means utilizing the mechanical connection by a linkage or like means has been defective among other things in that a large force is required for manipulating the shift lever and an improvement in the feeling of manipulation is difficult to attain, the shift lever may be unintentionally shifted from the set position during driving on, for example, a very uneven road, a large space is required for the installation of the linkage or like means, and the position of installation of the shift lever is limited.

SUMMARY OF THE INVENTION

It is a primary object of the present invention to provide an electrically controlled manual shift control means thereby to eliminate the linkage and like mechanical control means and to provide a hydraulic actuating system suitable for cooperation with such manual shift control means.

A feature of the present invention resides in the use of a hydraulic actuating system which does not employ a manual valve having a plurality of positions for providing communication between different fluid passages but employs a plurality of solenoid operated shift control valve means each having two positions electrically changed over so that various speed ratios can be established by a variety of combinations of the positions of the shift control valve means, and which includes an electrical switch which is changed over by a shift lever so as to control the current supplied to the solenoids of the solenoid operated shift control valve means. Thus, electrical wiring is solely required for functionally connecting the automatic transmission with the shift lever.

The arrangement which eliminates the use of the linkage or like means is advantageous among other things in that only a small force for merely changing over the electrical switch is required for manipulating the shift lever thereby improving the feeling of manipulation, the restrictions on the shape and position of installation of the shift lever can be substantially eliminated, and the automatic transmissions of the same type can be easily mounted on vehicles of various sizes and shapes by merely varying the length and arrangement of the electrical wiring.

BRIEF DESCRIPTION OF THE DRAWINGS

FIGS. 13, 15 and 19 are diagrammatic views showing the structure of hydraulic actuating systems for controlling transmissions shown in FIGS. 12, 14 and 18 respectively.

DESCRIPTION OF THE PREFERRED EMBODIMENTS

Figure 1:
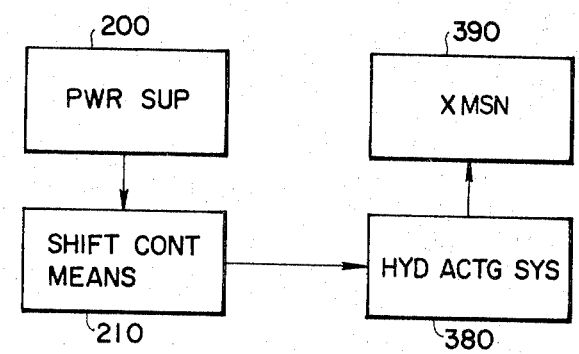
FIG. 1 is a block diagram of an automatic transmission for a vehicle having a control system embodying the present invention.

FIG. 1 is a block diagram showing the structure of an automatic transmission according to the present invention. Briefly, the automatic transmission is composed of an electric power supply 200, shift control means 210, a hydraulic actuating system 380 and a transmission 390. A torque converter automatic transmission having three forward speeds and one reverse speed as shown in FIG. 2 will be taken as a typical example of the automatic transmission.

Figure 2:
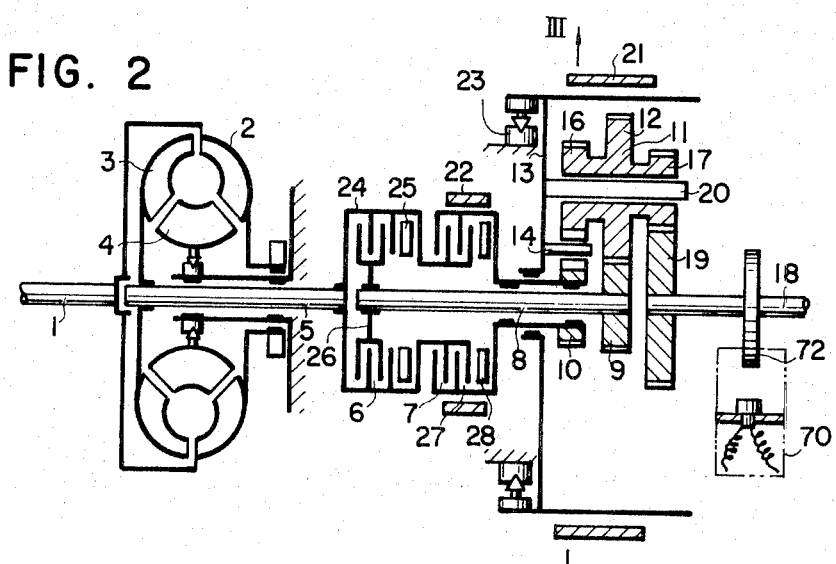
FIG. 2 is a schematic sectional view of an automatic transmission to which the present invention is applied.

In FIG. 2, the structure of such a fluid controlled automatic transmission is schematically shown. Referring to FIG. 2, the transmission comprises a hydraulic torque converter unit and a planetary gear unit arranged to provide three forward speeds and one reverse speed. The torque converter unit is of known construction including a pump impeller 2, a turbine impeller 3 and a stator 4. The pump impeller 2 is directly connected to the crankshaft 1 of an engine, and the power developed by the engine is transmitted from the pump impeller 2 to the turbine impeller 3 through the medium of hydraulic fluid which is returned to enter the pump impeller 2 again by being guided by the stator 4. A rotational force can be continuously derived from a turbine shaft 5 by the continuation of the above flow of the fluid. This rotational force is transmitted from the turbine shaft 5 to the planetary gear unit disposed at the output side of the torque converter unit to provide three forward speeds and one reverse speed.

The structure and operation of the planetary gear unit will now be described. The turbine shaft 5 is splined to a drum 24 for unitary rotation therewith. Disposed within the drum 24 is a multiple disc clutch 6 (hereinafter to be referred to as a front clutch) which is engaged by means of a piston 25 actuated by fluid under pressure. The drive plates of the front clutch 6 are splined to the drum 24, and the clutch discs are splined to a hub 26 which is splined to an intermediate shaft 8 for unitary rotation therewith so that, when the front clutch 6 is engaged, the rotational force is transmitted from the turbine shaft 5 to the intermediate shaft 8. The clutch discs of a multiple disc clutch 7 (hereinafter to be referred to as a rear clutch) are splined to the front clutch drum 24 for rotation in unison therewith, and the driven plates of the rear clutch 7 are splined to a drum 27. The rear clutch 7 is engaged by a fluid pressure actuated piston 28 disposed therewithin. The rear clutch drum 27 is connected integrally to a reverse sun gear 10 so that, when the rear clutch 7 is engaged, the rotational force is transmitted from the turbine shaft 5 to the reverse sun gear 10.

Figure 3:
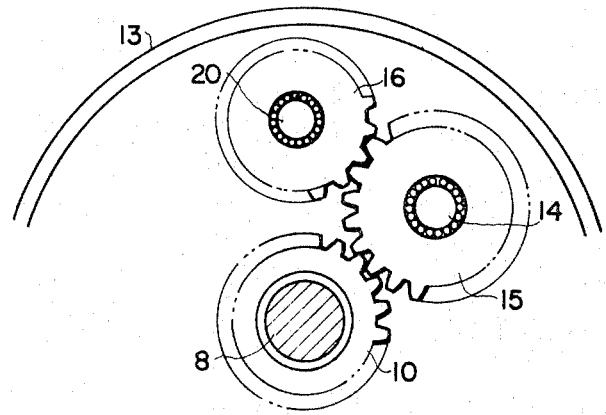
FIG. 3 is an enlarged sectional view taken on the line III — III in FIG. 2 with parts cut away to show in detail the relation between an idler gear not shown in FIG. 2 and the sun gear and planet pinion.

The intermediate shaft 8 is connected at its rear end to an input sun gear 9 which meshes with each gear 12 of a plurality of, for example, two or three planet pinions 11. The reverse sun gear 10 meshes with idler gears 15 (shown in FIG. 3) which mesh in turn with gears 16 of the planet pinions 11. The planet pinions 11 and the idler gears 15 are mounted on pinion pins 20 and 14 respectively fixed at one end to a carrier 13. The carrier 13 is locked against rotation and allowed to rotate freely when a brake band 21 (hereinafter to be referred to as a rear brake band) is engaged and released respectively. Similarly, the drum 27 of the rear clutch 7 is locked against rotation and allowed to rotate freely when a brake band 22 (hereinafter to be referred to as a front brake band) is engaged and released respectively. A one-way clutch 23 restricts the rotation of the carrier 13 in one direction. The rearmost gear 17 of each planet pinion 11 meshes with a gear 19 secured to the front end of an output shaft 18 which is rotated to provide three forward speeds and one reverse speed depending on the selective actuation of the element above described.

First speed — The front clutch 6 and the rear brake band 21 are actuated. (However, when the transmission is driven from the engine, the rear brake band 21 may not be actuated since the one-way clutch 23 is also actuated to lock the carrier 13 against rotation. In this case, however, no driving force is transmitted to the engine from the output shaft 18.) With the front clutch 6 and the rear brake band 21 so actuated, the rotation of the turbine shaft 5 is transmitted to the input sun gear 9 through the front clutch 6. Due to the fact that the carrier 13 is locked against rotation by the rear brake band 21, the pinion pins 20 are also held stationary and the rotation of the input sun gear 9 is transmitted to the gears 12 of the planet pinions 11, thence through the gears 17 to the gear 19 on the output shaft 18 so that the output shaft 18 is rotated at a reduced speed or first speed.

Second speed — The front clutch 6 is kept actuated and the front brake band 22 is actuated while releasing the rear brake band 21. Thus, the rotation of the turbine shaft 5 is transmitted directly to the input sun gear 9, but the reverse sun gear 10 is locked against rotation since the drum 27 of the rear clutch 7 is locked against rotation by the front brake band 22. The input sun gear 9 urges the planet pinions 11 to rotate in a direction (counter-clockwise) opposite to the direction of rotation (clockwise) of the turbine shaft 5, hence the input sun gear 9. The planet pinions 11 rotating in this direction try to rotate the idler gears 15 clockwise through the gears 16. However, due to the fact that the reverse sun gear 10 meshing with the idler gears 15 is locked against rotation, the pinion pins 14 revolve clockwise around the reverse sun gear 10. Due to this revolving motion of the pinion pins 14, the output shaft 18 is rotated at a speed reduction ratio smaller than that of the first speed in which the carrier 13, hence the pinion pins 14 are locked against revolution, thereby providing the second speed.

Third speed — The third speed can be obtained by engaging both the front and rear clutches 6 and 7. In this state, the input sun gear 9 and the reverse sun gear 10 are rotated in unison and the whole planetary gear system including the planet pinions 11 and idler gears 15 is unitarily rotated so that the turbine shaft 5 and the output shaft 18 are rotated in a 1 : 1 relationship.

Reverse — When reversing, the rear clutch 7 and the rear brake band 21 are actuated. The carrier 13, hence the pinion pins 14 and 20 are thereby locked against turning and the rotation of the turbine shaft 5 is transmitted through the rear clutch 7 to the reverse sun gear 10, thence through the idler gears 15 and the gears 16 and 17 of the planet pinions 11 to the gear 19 mounted on the output shaft 18 so that the output shaft 18 is rotated in the reverse direction.

Figure 4:
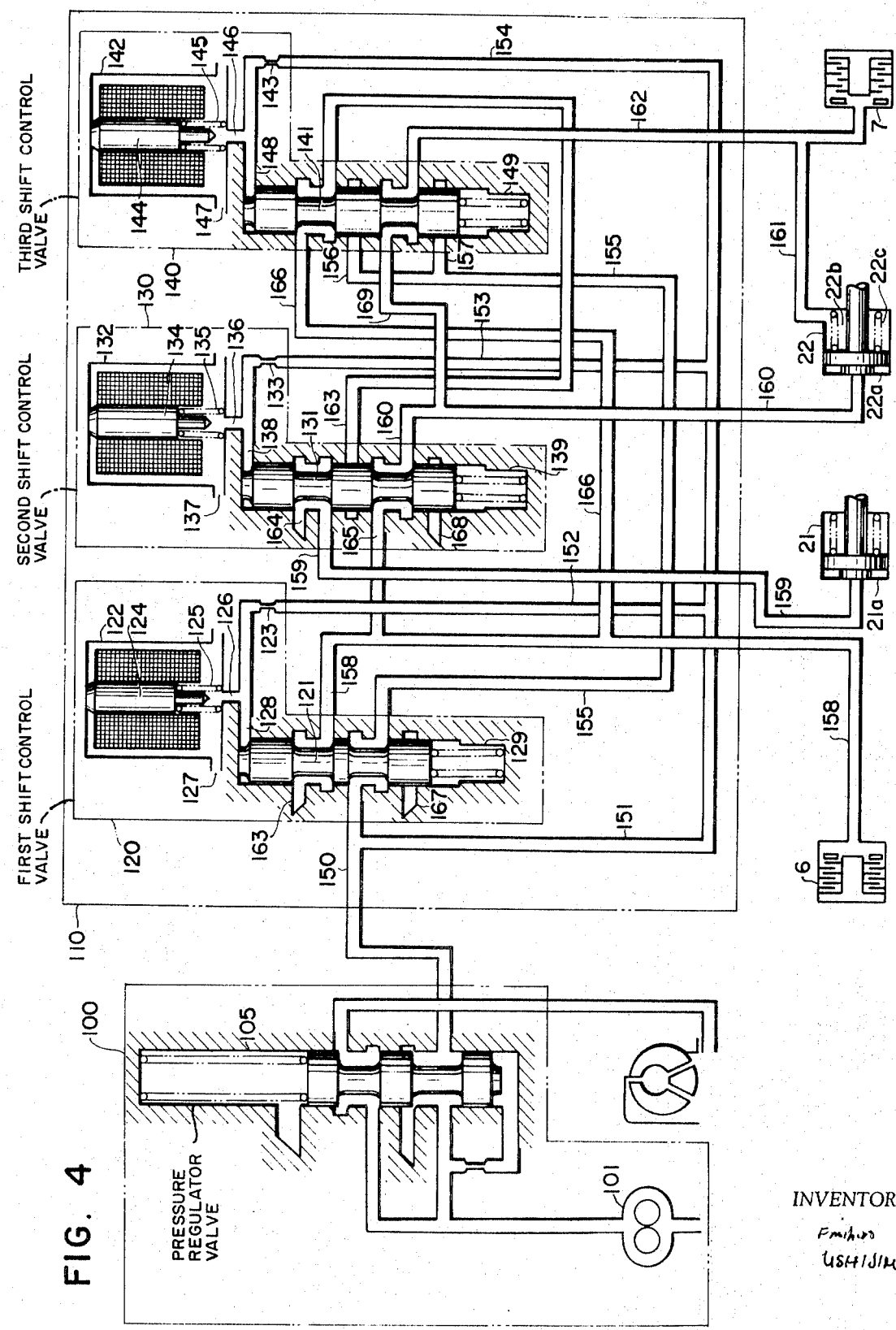
FIG. 4 is a diagrammatic view showing the structure of a hydraulic actuating system according to the present invention.

A hydraulic actuating system for controlling fluid under pressure supplied to fluid pressure operated servo means associated with the multiple disc clutches and brake bands will be described with reference to FIG. 4. Briefly, the hydraulic actuating system comprises a fluid pressure source 100 and a hydraulic actuating circuit 110 as shown in FIG. 4. The fluid pressure source 100 includes a pump 101, a pressure regulator valve 105 and fluid passages and functions to supply fluid under suitable pressure to the hydraulic actuating circuit 110. The hydraulic actuating circuit 110 includes three shift control valve means 120, 130 and 140 and fluid passages and functions to selectively supply fluid under pressure to the fluid pressure operated servo means by a suitable combination of the positions of the valve elements in the shift control valve means thereby shifting the gear position of the transmission to establish a desired speed ratio. The first shift control valve means 120 is composed of a first shift valve element 121, a first solenoid 122, an orifice 123, a plunger 124, a return spring 125 for the plunger 124, a return spring 129 for the shift valve element 121, etc. The second and the third shift valve means 130 and 140 are composed of similar elements. These shift control valve means 120, 130 and 140 are electrically controlled by shift control means described later and operate in a manner as described below for supplying fluid under pressure to the fluid pressure operated servo means.

Neutral — FIG. 4 illustrates the neutral position. All the solenoids 122, 132 and 142 are in the de-energized state and the plungers 124, 134 and 144 are urged to the upper position by the force of the return springs 125, 135 and 145 respectively. In this situation, fluid passages 126, 136 and 146 are not closed by the associated plungers 124, 134 and 144. Therefore, fluid under pressure which is supplied from the fluid pressure source 100 to fluid passages 128, 138 and 148 by way of fluid passages 150 and 151, fluid passages 152, 153 and 154 connected to the fluid passage 151, and orifices 123, 133 and 143 is discharged into pressure discharge ports 127, 137 and 147 by way of the fluid passages 126, 136 and 146 respectively, so that the fluid pressure in the fluid passages 128, 138 and 148 is reduced substantially to zero, and the shift valve elements 121, 131 and 141 are urged to the upper position by the force of the return springs 129, 139 and 149 respectively. In this state, all the fluid pressure operated servo means are not supplied with fluid under pressure, and since all the clutches and brake bands are not engaged, the rotation of the turbine shaft 5 cannot be transmitted to the output shaft 18.

First speed — The first and the second solenoids 122 and 132 are energized. (In this case, the third solenoid 142 may also be energized.) Due to the energization of the solenoids 122 and 132, the fluid passages 126 and 136 are closed by the associated plungers 124 and 134, so that fluid pressure builds up in the fluid passages 128 and 138 to urge the first and second shift valve elements 121 and 131 to the lower position. When the first and second shift valve elements 121 and 131 are moved to the lower position, the fluid passage 150 communicates through the first shift control valve means 120 with a fluid passage 158 leading to the hydraulic servo chamber for the front clutch 6 so that fluid under pressure is supplied to the front clutch servo chamber to engage the front clutch 6. Fluid under pressure is also supplied from the fluid passage 158 to a fluid passage 166, thence through the third shift control valve means 140 to a fluid passage 163, and through the second shift control valve means 130 to a fluid passage 159 leading to the applyside hydraulic servo chamber 21a for the rear brake band 21 to apply the rear brake band 21 thereby providing the first speed. When the third solenoid 142 is also energized, the fluid passage 146 is closed by the plunger 144 and fluid pressure builds up in the fluid passage 148 to urge the third shift valve element 141 to the lower position thereby shutting off the fluid flow through the fluid passage 166. Although, in this case, no fluid under pressure is supplied to the hydraulic servo chamber 21a for the rear brake band 21, the one-way clutch 23 is actuated to provide the first speed as described previously even though the rear brake band 21 is not engaged.

Second speed — The first and third solenoids 122 and 142 are energized, while the second solenoid 132 is de-energized. In this state, fluid under pressure is supplied to the hydraulic servo chamber for the front clutch 6 through the fluid passage 158 to engage the front clutch 6. Fluid under pressure is also supplied from the fluid passage 158 to a fluid passage 165, thence through the second shift control valve means 130 to a fluid passage 160 leading to the apply-side hydraulic servo chamber 22a for the front brake band 22 to apply the front brake band 22. The second speed can be obtained when thus the front clutch 6 and front brake band 22 are engaged.

Third speed — The first solenoid 122 is solely energized while the second and third solenoids 132 and 142 are de-energized. In this case, fluid under pressure is supplied to the hydraulic servo chamber for the front clutch 6 and to the applyside hydraulic servo chamber 22a for the front brake band 22 as in the case of the second speed, and the fluid passage 160 supplying fluid under pressure to the apply-side hydraulic servo chamber 22a communicates with a fluid passage 162 through a fluid passage 169 and the third shift control valve means 140. The fluid passage 162 leads to the hydraulic servo chamber for the rear clutch 7 and to the release-side hydraulic servo chamber 22b for the front brake band 22. The front brake band 22 is released by the action of a return spring 22c due to the fact that fluid under pressure is supplied to both the apply-side and release-side hydraulic servo chambers 22a and 22b for the front brake band 22. Therefore, the front clutch 6 and rear clutch 7 are actuated while the front brake band 22 is released to provide the third speed.

Reverse — The first solenoid 122 is de-energized, while the second and third solenoids 132 and 142 are energized. In this case, fluid under pressure supplied from the fluid pressure source 100 is fed through the fluid passage 150 and the first shift control valve means 120 to the fluid passage 155, thence through the fluid passages 156 and 157 and the third shift control valve means 140 to the fluid passages 162 and 163 respectively. The fluid passage 162 leads to the release-side hydraulic servo chamber 22b for the front brake band 22 and to the hydraulic servo chamber for the rear clutch 7 so that fluid under pressure is supplied to these hydraulic servo chambers. Fluid under pressure supplied to the fluid passage 163 is fed through the second shift control valve means 130 to the fluid passage 159 leading to the apply-side hydraulic servo chamber 21a for the rear brake band 21. Therefore, the rear clutch 7 and rear brake band 21 are engaged to provide the reverse driving condition for the vehicle.

The shift control means for controlling the energization and de-energization of the first, second and third solenoids 122, 132 and 142 will now be described. The shift control means consists of manual shift control means and automatic shift control means. The manual shift control means have a function to shift the gear position of the transmission to one of five positions, that is, the reverse position (R position), neutral position (N position), automatic shift position (D position), fixed second speed position (2 position) and fixed first speed position (L position) in response to the manipulation of a shift lever or like means by the driver. The automatic shift control means have a function to automatically shift the gear position within the range of the first to the third speed depending on the driving conditions of the vehicle when the manual shift control means is set at the D position.

Table 1 shows the relation between the energization and de-energization of the solenoids controlled by the shift control means.

TABLE 1

| | R | N | D 1st speed | D 2d speed | D 3d speed | 2 | L |
|---|---|---|---|---|---|---|---|
| First solenoid | Deenergized | Deenergized | Energized | Energized | Energized | Energized | Energized. |
| Second solenoid | Energized | do | do | Deenergized | Deenergized | Deenergized | Do. |
| Third solenoid | do | do | do | Energized | do | Energized | Deenergized. |

Figure 5:
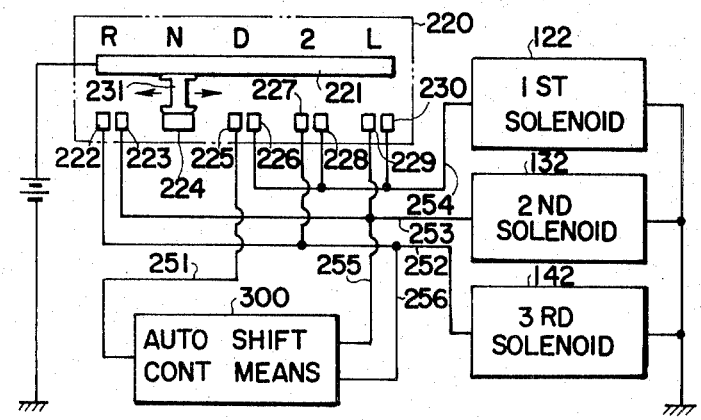
FIG. 5 is an electrical connection diagram showing the structure of shift control means for controlling the hydraulic actuating system shown in FIG. 4.

FIG. 5 is an electrical connection diagram showing the structure of the shift control means consisting of the manual shift control means 220 and the automatic shift control means 300. The manual shift control means 220 is composed of a common stationary contact 221 connected to a power supply, a plurality of stationary contacts 222, 223, 224, 225, 226, 227, 228, 229 and 230 disposed to correspond to the R, N, D, 2 and L positions respectively, and a movable contact 231 moved to one of the above positions by the shift lever or like means manipulated by the driver to establish an electrical connection between the common stationary contact 221 and the stationary contact or contacts corresponding to the position selected by the driver. In FIG. 5, the movable contact 231 is in the N position in which no electrical power is supplied to the first, second and third solenoids 122, 132 and 142 and to the automatic shift control means 300. When the movable contact 231 is moved to the left in FIG. 5 to take the R position, the common stationary contact 221 is electrically connected to the stationary contacts 222 and 223 so that power is supplied to the second and third solenoids 132 and 142 by leads 253 and 252 respectively. Similarly, these solenoids are suitably energized and de-energized as seen in Table 1 depending on the D, 2 or L position. In the D position, power is supplied to the first solenoid 122, and at the same time, to the automatic shift control means 300 so that the automatic shift control means 300 controls the energization and de-energization of the second and third solenoids 132 and 142 in a manner as will be described later. As seen in FIG. 5, two stationary contacts are provided for each of the R, D, 2 and L positions and are electrically insulated from each other so as to control the solenoids independently of each other. However, a single contact may be provided for each position and connected to the solenoid through a unidirectional element such as a diode.

Figure 6:
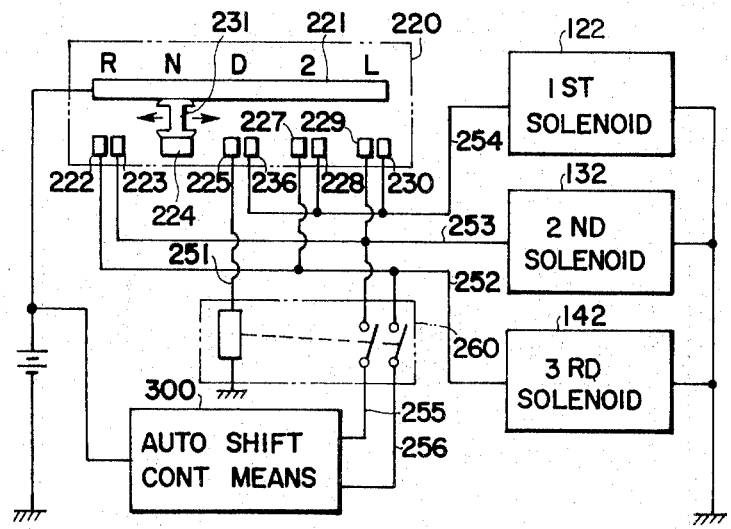
FIG. 6 is an electrical connection diagram showing the structure of a modification of the shift control means shown in FIG. 5.

In the arrangement shown in FIG. 5, power is supplied to the automatic shift control means 300 only when the movable contact 231 takes the D position, that is, when the shift lever or like means is shifted to the D position by the driver. In a modification shown in FIG. 6, the automatic shift control means 300 is continuously supplied with electrical power and its output is applied to the solenoids through switching means such as a switching relay 260 which is energized only when the shift lever or like means is shifted to the D position.

Figure 7:
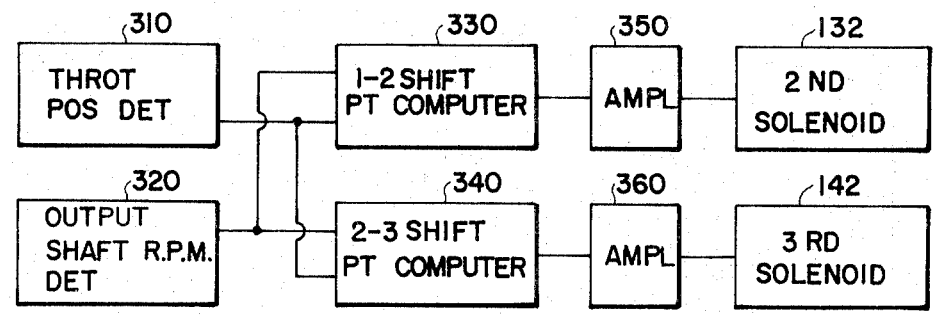
FIG. 7 is a block diagram showing the structure of automatic shift control means forming part of the shift control means shown in FIG. 5.

The structure and operation of the automatic shift control means 300 which controls automatically the energization and de-energization of the solenoids depending on the driving conditions of the vehicle in the D position will be described with reference to FIG. 7. Referring to FIG. 7, the automatic shift control means 300 is composed of a throttle position detector 310, an output shaft r.p.m. detector 320, a 1-2 shift point computer 330, a 2-3 shift point computer 340, amplifiers 350 and 360, and a power supply circuit not shown.

Figure 8:
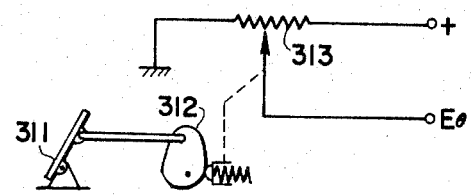
FIGS. 8, 9 and 10 are diagrams showing the structure of a throttle position detector, an output shaft r.p.m. detector and a shift point computer, respectively, constituting the automatic shift control means shown in FIG. 5.

The throttle position detector 310 detects the opening of the engine throttle valve indicative of one of the driving conditions of the vehicle and delivers an electrical signal representative of the throttle position. The throttle position detector 310 may have a structure as shown in FIG. 8. Referring to FIG. 8, a cam 312 is operatively connected to the accelerator pedal 311, and a voltage is applied across a variable resistor 313 provided with a movable arm actuated by the cam 312 so as to derive from the movable arm a voltage or throttle position signal $E_\theta$ which increases with the increase in the throttle valve opening.

Figure 9:
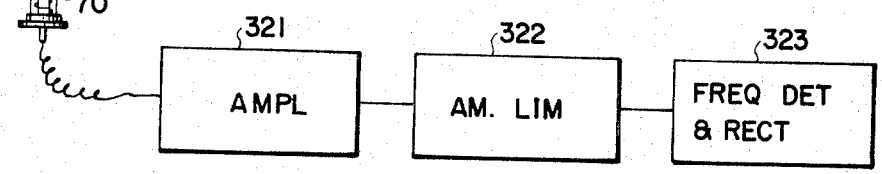

The output shaft r.p.m. detector 320 detects the rotating speed of the output shaft of the transmission proportional to the vehicle speed which is indicative of one of the driving conditions of the vehicle and delivers an electrical signal representative of the r.p.m. of the output shaft. The output shaft r.p.m. detector 320 may have a structure as shown in FIG. 9. Referring to FIG. 9, a toothed disc 72 of magnetic material is securely mounted on the output shaft 18 of the transmission, and a sensor 70 consisting of a permanent magnet and a coil wound around the permanent magnet is disposed in close proximity to the toothed disc 72. The a.c. voltage induced in the coil of the sensor 70 due to the rotation of the output shaft 18 is amplified by an amplifier 321 and the amplitude of the amplified voltage is limited to a constant level by an amplitude limiter 322. The output from the amplitude limiter 322 is converted by a frequency detector and rectifier 323 into a d.c. voltage proportional to the frequency so as to obtain an output shaft r.p.m. signal $E_N$ proportional to the r.p.m. of the output shaft, hence the vehicle speed.

Figure 10:
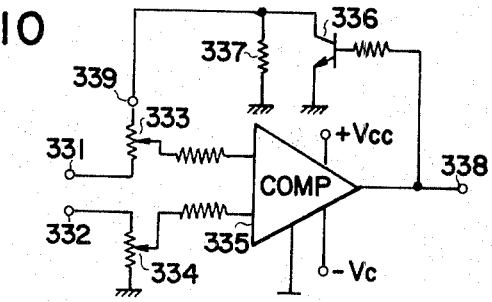

The throttle position signal $E_\theta$ and the output shaft r.p.m. signal $E_N$ are applied to the 1-2 and 2-3 shift point computers 330 and 340. In response to the application of these input signals, the 1-2 shift point computer 330 delivers an output signal determining the energization or de-energization of the second solenoid 132 depending on the relation between these two signals thereby causing a shift between the first and second speeds. The 1-2 shift point computer 330 may have a structure as shown in FIG. 10. Referring to FIG. 10, the 1-2 shift point computer 330 is composed of a comparator 335, a simple transistor circuit and variable resistors. In response to the application of the output shaft r.p.m. signal $E_N$ and throttle position signal $E_\theta$ to input terminals 331 and 332, voltages $E_N'$ and $E_\theta'$ appear on the movable arms of variable resistors 333 and 334 respectively. The comparator 335 compares $E_N'$ with $E_\theta'$. A signal of low voltage level (hereinafter to be referred to as "0") appears at an output terminal 338 when $E_N' \geq E_\theta'$, while a signal of high voltage level (hereinafter to be referred to as "1") appears at the output terminal 338 when $E_N' < E_\theta'$. Suppose now that $E_N' < E_\theta'$, then "1" appears at the output terminal 338 and this signal is applied through a suitable resistor to the base of a transistor 336. The transistor 336 conducts and the terminal 339 of the variable resistor 333 is grounded through the transistor 336 which is conducting. Therefore, $E_N'$ is given by $R_2/R_1 \cdot E_N$ where $R_1$ is the resistance of the variable resistor 333 and $R_2$ is the resistance between the movable arm and the terminal 339 of the variable resistor 333. On the other hand, $E_\theta'$ is given by $E_\theta' = (R_4/R_3) \cdot E_\theta$ where $R_3$ is the resistance of the variable resistor 334 and $R_4$ is the resistance between the movable arm and the grounded terminal of the variable resistor 334. Thus, the output signal of the comparator 335 changes from "1" to "0" when the condition $E_N \geq (R_1/R_2) \times (R_4/R_3) \cdot E_\theta = AE_\theta$ is satisfied in view of the fact that "0" appears when the relation $E_N' \geq E_\theta'$ holds.

When "0" appears from the comparator 335, the potential at the base of transistor 336 is sufficiently low and the transistor 336 is maintained in the cut-off state. Therefore, the terminal 339 of the variable resistor 333 is grounded through a resistor 337 and $E_N'$ is now given by $E_N' = (R_2 + R_5/R_1 + R_5) \cdot E_N$ where $R_5$ is the resistance of the resistor 337. Thus, the output signal of the comparator 335 changes from "0" to "1" when the condition $E_N < (R_1+R_5/R_2+R_5) \times (R_4/R_3) \cdot E_\theta = A'E_\theta$ ($A' < A$) is satisfied in view of the fact that "1" appears when the relation $E_N' < E_\theta'$ holds. It will be seen that the output signal of the comparator 335 changes from "0" to "1" under the condition which differs from the condition in which the output signal of the comparator 335 changes from "1" to "0." This arrangement is advantageous in that the output signal is prevented from hunting between "0" and "1."

The comparator 335 compares the throttle position signal $E_\theta$ and the output shaft r.p.m. signal $E_N$ with each other and delivers "0" or "1" depending on the result of comparison as described above. When "1" is delivered, this signal is amplified by the amplifier 350 to energize the second solenoid 132.

The structure of the 2-3 shift point computer 340 is entirely similar to that of the 1-2 shift point computer 330. The 2-3 shift point computer 340 delivers a signal determining the energization or de-energization of the third solenoid 142 thereby causing a shift between the second and third speeds. As in the case of the 1-2 shift point computer 330, the output signal of the 2-3 shift point computer 340 changes from "1" to "0" when the input signals satisfy the relation $E_N \geq BE_\theta$ and from "0" to "1" when the input signals satisfy the relation $E_N < B'E_\theta$ ($B' < B$). When "1" appears from the 2-3 shift point computer 340, this signal is amplified by the amplifier 360 to energize the third solenoid 142.

Figure 11:
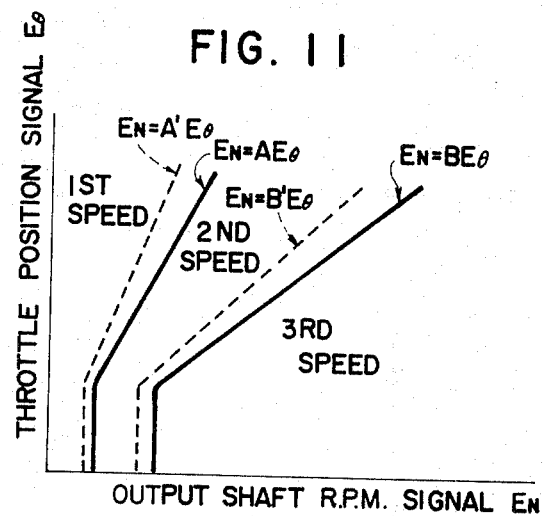
FIG. 11 is a chart showing the shift points or lines determined by the automatic shift control means.

The constants A, A', B and B' may be suitably selected as desired. Suppose now that the vehicle speed is gradually increased under a constant throttle valve opening. In the state in which the vehicle speed is sufficiently low, both the 1-2 shift point computer 330 and the 2-3 shift point computer 340 deliver "1" and both the second and third solenoids 132 and 142 are energized. Since the first solenoid 122 is also energized by the manual shift control means 220 in this case, the transmission is in the first speed position. Then, when the vehicle speed is increased until the relation $E_N \geq AE_\theta$ is satisfied, "0" appears from the 1-2 shift point computer 330 and the second solenoid 132 is solely de-energized to give the second speed. When the vehicle speed is further increased until the relation $E_N \geq BE_\theta$ is satisfied, "0" appears from the 2-3 shift point computer 340 and the third solenoid 142 is also de-energized to provide the third speed. Conversely, when the vehicle speed is gradually decreased from the third speed, a shift from the third to the second speed and a shift from the second to the first speed occur when the relation $E_N < B'E_\theta$ and the relation $E_N < A'E_\theta$ are satisfied respectively. FIG. 11 shows the shift points or lines determined by the automatic shift control means 300 relative to the throttle position signal $E_\theta$ and output shaft r.p.m. signal $E_N$.

The embodiment described above relates to an application of the present invention to a three-forward speed and one-reverse speed transmission employing two multiple disc clutches and two brake bands. However, the present invention is in no way limited to such a specific embodiment and is applicable to various automatic transmissions. For example, the the present invention is applicable to a three-forward speed and one-reverse speed automatic transmission employing four multiple disc clutches.

Figure 12:
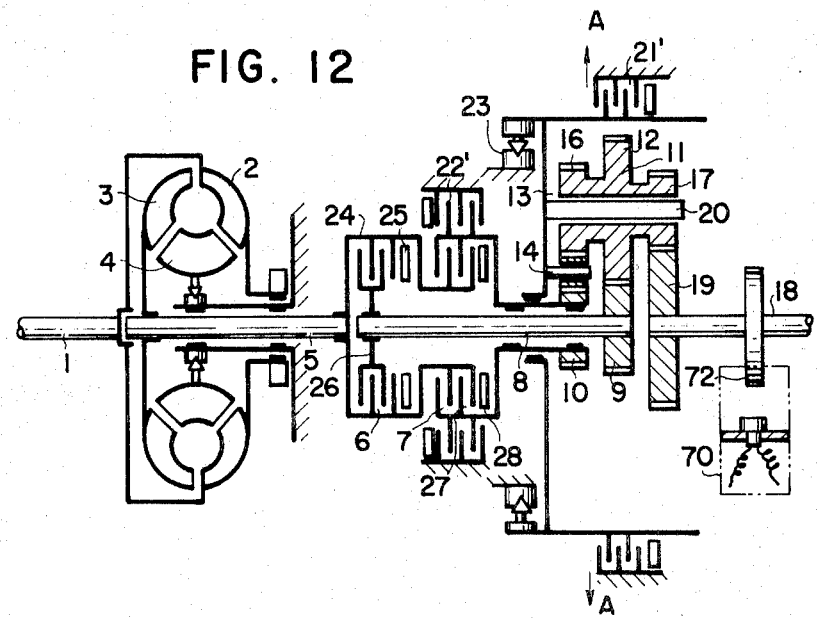
FIGS. 12, 14 and 18 are schematic sectional views of automatic transmissions to which the present invention is applied.

FIG. 12 shows the structure of a typical three-forward speed and one-reverse speed automatic transmission employing two multiple disc clutches and two multiples disc brakes. This structure is equivalent to one in which the front brake band 22 and the rear brake band 21 of the transmission employing two multiple disc clutches and two brake bands shown in FIG. 2 are replaced by a first multiple disc brake 22' and a second multiple disc brake 21' respectively. Any description as to the operation of this transmission is unnecessary since these clutches and brakes are engaged and released in a manner completely similar to that described with reference to FIG. 2 for establishing various speed ratios.

Figure 13:
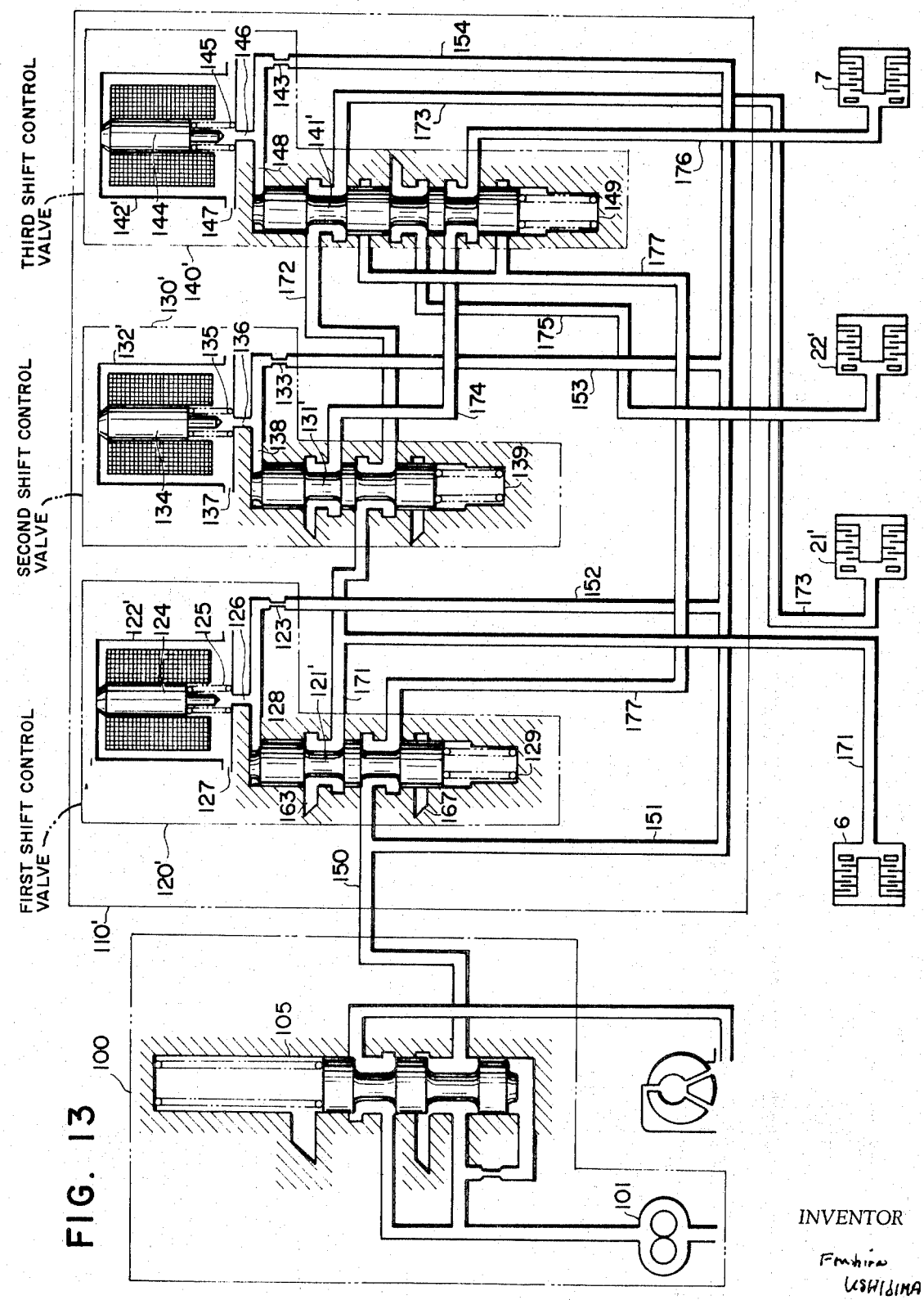

FIG. 13 shows a hydraulic actuating system for controlling fluid under pressure supplied to fluid pressure operated servo means in the transmission shown in FIG. 12 for establishing various speed ratios, and like reference numerals are used in FIG. 13 to denote like parts appearing in FIG. 4. Although the hydraulic actuating system shown in FIG. 13 is generally similar in structure to the hydraulic actuating system shown in FIG. 4, second and third shift control valve means and associated fluid passages are different in structure and arrangement from those shown in FIG. 4 due to the fact that the brake bands are replaced by multiple disc brakes. The hydraulic actuating system shown in FIG. 13 comprises a first shift control valve means 120', a second shift control valve means 130' and a third shift control valve means 140' including a first shift valve element 121', a second shift valve element 131' and a third shift valve element 141', and a first solenoid 122', a second solenoid 132' and a third solenoid 142', respectively. The operation of the hydraulic actuating system for supplying fluid under pressure to the fluid pressure operated servo means for establishing various speed ratios will now be described with reference to FIG. 13.

Neutral — All the solenoids 122', 132' and 142' are de-energized. Thus, all the shift valve elements 121', 131' and 141' are urged to the upper position as described previously and no fluid under pressure is supplied to any of the hydraulic servo chambers for multiple disc clutches 6 and 7 and multiple disc brakes 21', 22'.

First speed — The first solenoid 122' is solely energized. (The third solenoid 142' may also be energized.) Thus, the first shift valve element 121' is urged to the lower position and a fluid passage 150 communicates with a fluid passage 171 through the first shift control valve means 120' so that fluid under pressure is supplied to the hydraulic servo chamber for the front clutch 6. Further, the fluid passage 171 communicates with a fluid passage 173 through the second shift control valve means 130', a fluid passage 172 and the third shift control valve means 140' so that fluid under pressure is supplied to the hydraulic servo chamber for the second multiple disc brake 21'. Thus, the front clutch 6 and second brake 21' are engaged to establish the first speed position in the transmission. Suppose that the third solenoid 142' is also energized. In response to the energization of the third solenoid 142, the fluid passage 172 is blocked by the third shift valve element 141' and no fluid under pressure is supplied to the hydraulic servo chamber for the second brake 21' so that this brake 21' is not engaged, but a one-way clutch 23 is actuated to provide the first speed.

Second speed — All the solenoids 122', 132' and 142' are energized. In this state, all the shift valve elements 121', 131' and 141' are urged to the lower position and fluid under pressure is supplied to the hydraulic servo chamber for the front clutch 6 as in the case of the first speed. Further, the fluid passage 171 communicates through the second shift control valve means 130' with a fluid passage 174, thence through the third shift control valve means 140' with a fluid passage 175 so that fluid under pressure is supplied to the hydraulic servo chamber for the first multiple disc brake 22' to provide the second speed.

Third speed — The first and second solenoids 122' and 132' are energized while the third solenoid 142 is de-energized. In this state, the fluid passage 171 communicates through the second shift control valve means 130' with the fluid passage 174, thence through the third shift control valve means 140' with a fluid passage 176 so that fluid under pressure is supplied to the hydraulic servo chamber for the rear clutch 7. Thus, the front clutch 6 and rear clutch 7 are engaged to provide the third speed.

Reverse — The third solenoid 142' is energized while the first and second solenoids 122' and 132' are de-energized. In this state, the fluid passage 150 communicates through the first shift control valve means 120' with a fluid passage 177, thence through the third shift control valve means 140' with the fluid passages 173 and 176 so that fluid under pressure is supplied to the hydraulic servo chambers for the second brake 21' and rear clutch 7. Thus, the clutch and brake 21' 7 are engaged to establish the reverse driving condition.

When the first solenoid 122' is de-energized that is, in the N and R positions, no fluid under pressure is present in the fluid passage 171 and the second shift control valve means 130' does not participate in the supply of fluid under pressure. In this state, therefore, the second solenoid 132' may be either energized or de-energized.

The shift control means for controlling the fluid under pressure supplied to the fluid pressure operated servo means in the hydraulic actuating system shown in FIG. 13 must energize and de-energize the solenoids in a manner as shown in Table 2. Table 2 is entirely the same as Table 1 except that the mode of energization and de-energization of the second solenoid 132' in Table 2 is entirely contrary to that shown in Table 1.

TABLE 2

|  | R | N | D 1st speed | 2d speed | 3d speed | 2 | L |
|---|---|---|---|---|---|---|---|
| First solenoid | Deenergized | Deenergized | Energized | Energized | Energized | Energized | Energized. |
| Second solenoid | Energized or deenergized | | Deenergized | do | do | do | Deenergized. |
| Third solenoid | Energized | Deenergized | Energized | do | Deenergized | do | Do. |

Therefore, the shift control means for controlling the fluid pressure operated servo means in the hydraulic actuating system shown in FIG. 13 can be easily obtained by slightly modifying the wiring in the manual shift control means 220 shown in FIG. 5 and interposing an inverter between the 1-2 shift point computer 330 and the amplifier 350 in the automatic shift control means 300 shown in FIG. 7 for inverting the output signal of the 1-2 shift point computer 330.

Figure 14:
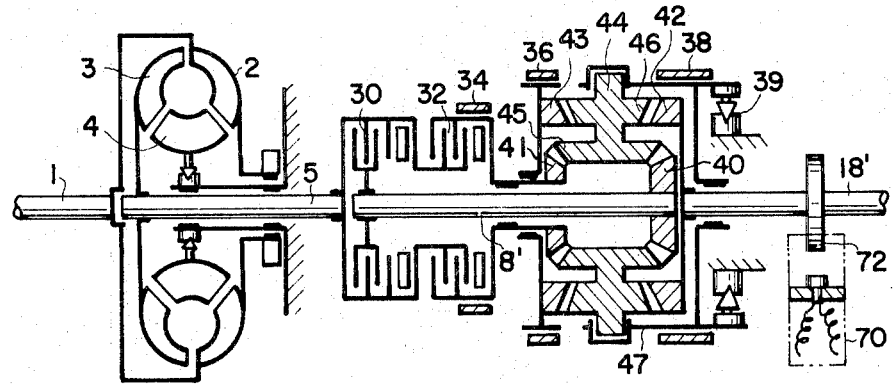

The present invention is applicable further to a four-forward speed and one-reverse speed automatic transmission employing two multiple disc clutches and three brake bands as shown in FIG. 14. This transmission comprises a hydraulic torque converter, two multiple disc clutches 30 and 32, three brake bands 34, 36 and 38, a one-way clutch 39 and a gear train. The gear train includes a first input bevel gear 40, a second input bevel gear 41, an output bevel gear 42, a fourth bevel gear 43 and pinions 44 to provide various speed ratios.

First speed — The first clutch 30 is actuated. When the first clutch 30 is engaged, the rotation of a turbine shaft 5 is transmitted through the first clutch 30 to an intermediate shaft 8', and the first input bevel gear 40 secured to the intermediate shaft 8' is rotated. The rotation of the first input bevel gear 40 causes rotation of the pinions 44 meshing with this gear 40, and since a carrier 47 carrying the pinions 44 is locked against rotation by the one-way clutch 39, the rotation of the pinions 44 causes rotation of the output bevel gear 42 meshing therewith. Thus, the rotation of the turbine shaft 5 is transmitted to an output shaft 18' at a reduction ratio which is determined by the gear ratios of the first input bevel gear 40, larger bevel pinions 45 and smaller bevel pinions 46 of the pinions 44, and the output bevel gear 42.

Second speed — The first clutch 30 and the second brake band 36 are actuated. The rotation of the turbine shaft 5 is similarly transmitted to the intermediate shaft 8' so that the first input bevel gear 40 is rotated to try to rotate the pinions 44. However, due to the fact that the fourth bevel gear 43 meshing with the smaller bevel pinions 46 is locked against rotation by the second brake band 36, the pinions 44 revolve in a direction in which the rotation of the carrier 47 is not restricted by the one-way clutch 39. Thus, the output bevel gear 42, hence the output shaft 18' is rotated at the second speed higher than the first speed.

Third speed — The first clutch 30 and the first brake band 34 are actuated. The rotation of the turbine shaft 5 is similarly transmitted to the intermediate shaft 8' so that the first input bevel gear 40 is rotated to try to rotate the pinions 44. However, due to the fact that the second input bevel gear 41 meshing with the larger bevel pinions 45 is locked against rotation by the first brake band 34, the pinions 44 revolve as in the case of the second speed but at a higher rate than in the second speed. Thus, the output shaft 18' is rotated at a reduction ratio less than that for the second speed thereby providing the third speed.

Fourth speed — The first and second clutches 30 and 32 are actuated simultaneously. In this case, the rotation of the turbine shaft 5 is transmitted to both the first input bevel gear 40 and the second input bevel gear 41 so that the whole gear train is rotated unitarily and the output shaft 18' is rotated at the speed of the turbine shaft 5.

Reverse — The second clutch 32 and the third brake band 38 are actuated. In this case, the rotation of the turbine shaft 5 is transmitted to the second input bevel gear 41 to rotate the pinions 44 in a direction opposite to the direction of rotation during the first to third speed, and since the carrier 47 carrying the pinions 44 is locked against rotation by the third brake band 38, the output bevel gear 42 is rotated in the reverse direction.

The clutches and brake bands above described are actuated by a hydraulic actuating system as shown in FIG. 15. The hydraulic actuating system consists of a fluid pressure source 100 and a hydraulic actuating circuit 110" and has a structure similarly to that shown in FIG. 4, and like reference numerals are used in FIG. 15 to denote like parts apperaring in FIG. 4. The hydraulic actuating circuit 110" is featured by the fact that four forward speeds and one reverse speed can be obtained by means of three shift control valve means 120", 130" and 140" comprising a first shift valve element 121", a second shift valve element 131" and a third shift valve element 141", and a first solenoid 122", a second solenoid 132" and a third solenoid 142", respectively.

The shift control valve means 120", 130" and 140" operate in a manner similar to that described with reference to FIG. 4 and any description as to the operation of these shift control valve means is unnecessary. Fluid under pressure is selectively supplied to the hydraulic servo chambers for the clutches and brake bands to provide various speed ratios.

Neutral — All the solenoids 122", 132" and 142" are de-energized. In this state, fluid under pressure in a fluid passage 150 is supplied solely to the hydraulic servo chamber for the third brake band 38 through the first shift control valve means 120" and a fluid passage 181 thereby engaging the brake band 38. However, the output shaft 18' is not rotated since no driving force is transmitted from the turbine shaft 5.

First speed — The first and third solenoids 122" and 142" are energized. In this state, the fluid passage 150 communicates through the first shift control valve means 120" with a fluid passage 180 leading to the hydraulic servo chamber for the first clutch 30 to supply fluid under pressure to this servo chamber thereby engaging the first clutch 30 to provide the first speed.

Second speed — All the solenoids 122", 132" and 142" are energized. In this state, the fluid passage 150 communicates through the first shift control valve means 120" with the fluid passage 180 leading to the hydraulic servo chamber for the first clutch 30 to supply fluid under pressure to this servo chamber thereby engaging the first clutch 30, and at the same time, communicates through the fluid passage 180 and the second shift control valve means 130" with a fluid passage 184 leading to the apply-side hydraulic servo chamber for the second brake band 36 to supply fluid under pressure to this servo chamber thereby engaging the second brake band 36 to provide the second speed.

Third speed — The first and second solenoids 122" and 132" are energized. In this state, fluid under pressure is supplied to the hydraulic servo chamber for the first clutch 30 to engage the first clutch 30, and fluid under pressure is also supplied to the apply-side hydraulic servo chamber for the second brake band 36 to engage the brake band 36 as in the case of the second speed above described. Further, the fluid passage 180 communicates through a fluid passage 182 and the third shift control valve means 140" with a fluid passage 187 leading to the release-side hydraulic servo chamber for the second brake band 36 and to the apply-side hydraulic servo chamber for the first brake band 34 to supply fluid under pressure to these servo chambers. The first brake band 34 is thereby engaged, but the second brake band 36 is released due to the fact that fluid under pressure is equally supplied to both the apply-side and release-side hydraulic servo chambers therefor. Thus, the third speed is obtained.

Fourth speed — The first solenoid 122" is solely energized. In this state, fluid under pressure is supplied to the fluid passage 180 leading to the hydraulic servo chamber for the first clutch 30 thereby engaging the first clutch 30. Further, the fluid passage 180 communicates through the fluid passage 182 and the third shift control valve means 140" with the fluid passage 187 leading to the apply-side hydraulic servo chamber for the first brake band 34 and to the release-side hydraulic servo chamber for the second brake band 36 to supply fluid under pressure to these servo chambers. Furthermore, the fluid passage 180 communicates through a fluid passage 183, the third shift control valve means 140", a fluid passage 185 and the second shift control valve means 130" with a fluid passage 186 leading to the hydraulic servo chamber of the second clutch 32 and with the release-side hydraulic servo chamber of the first brake band 34 to supply fluid under pressure to these servo chambers.

As a result, the first and second clutches 30 and 32 are engaged to provide the fourth speed.

Reverse — The third solenoid 142" is solely energized. In this state, the fluid passage 150 communicates through the first shift control valve means 120" with the fluid passage 181 leading to the hydraulic servo chamber for the third brake band 38 to supply fluid under pressure to this servo chamber thereby engaging the third brake band 38. Further, the fluid passage 181 communicates through the third shift control valve means 140" with the fluid passage 185, thence through the second shift control valve means 130" with the fluid passage 186 leading to the hydraulic servo chamber for the second clutch 32 to supply fluid under pressure to this servo chamber thereby establishing the reverse driving condition.

Figure 18:
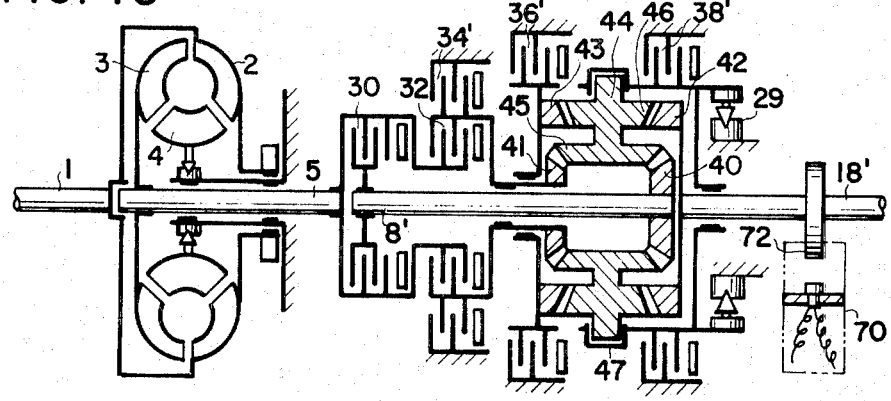

The energization and de-energization of the solenoids for selectively actuating the clutches and brake bands are summarized in Table 3.

above described, the present invention is also applicable to a four-forward speed and one-reverse speed automatic transmission employing two multiple disc clutches and three multiple disc brakes as shown in FIG. 18.

The transmission shown in FIG. 18 is generally similar to the transmission shown in FIG. 14 except that the

TABLE 3

| | | | D | | | | | | |
|---|---|---|---|---|---|---|---|---|---|
| R | N | 1st speed | 2d speed | 3d speed | 4th speed | 3 | 2 | L |
| First solenoid | Deenergized | Deenergized | Energized | Energized | Energized | Energized | Energized | Energized | Energized. |
| Second solenoid | do | do | Deenergized | do | do | Deenergized | do | Energized | Deenergized. |
| Third solenoid | Energized | do | Energized | do | Deenergized | do | Deenergized | do | Energized. |

Figure 16:
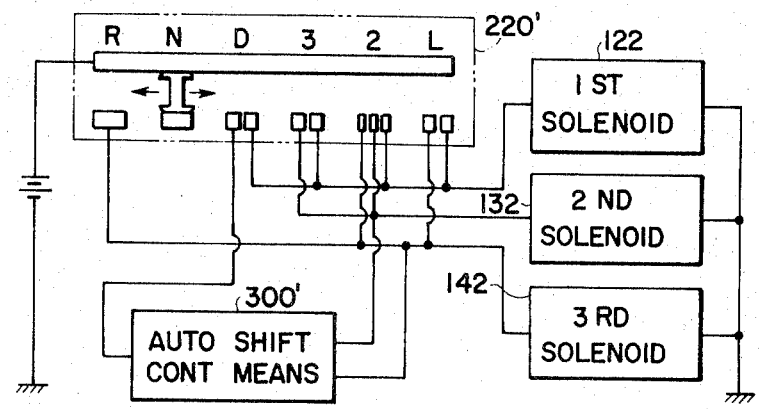
FIG. 16 is an electrical connection diagram showing the structure of shift control means for controlling the hydraulic actuating system shown in FIG. 15.

The shift control means for energizing and de-energizing the solenoids in the manner shown in Table 3 may have a structure as shown in FIG. 16. The shift control means consists of manual shift control means 220' and automatic shift control means 300' as in the case of the shift control means shown in FIG. 5 and has a structure analogous to that shown in FIG. 5. The operation of the shift control means is apparent from the description given with reference to FIG. 5 and any description as to it is unnecessary except for the automatic shift control means 300' which will be described below.

Figure 17:
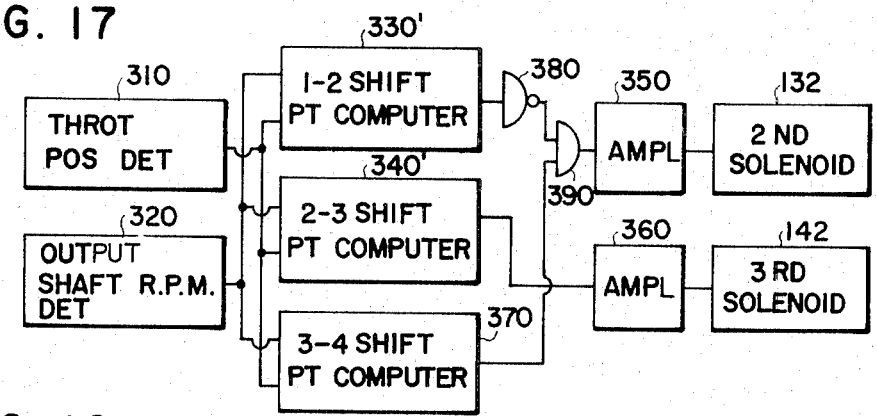
FIG. 17 is a block diagram showing the structure of automatic shift control means forming part of the shift control means shown in FIG. 16.

The automatic shift control means 300' has a structure as shown in FIG. 17. Referring to FIG. 17, the automatic shift means 300' includes a 1-2 shift point computer 330', a 2-3 shift point computer 340' and a 3-4 shift point computer 370 which determine the shift points on the basis of the relation between the throttle position signal $E_\theta$ and the output shaft r.p.m. signal $E_N$ like the shift point computers 330 and 340 shown in FIG. 7 and have a structure similar to that shown in FIG. 10.

The output signals of these three shift point computers 330', 340' and 370 should be "1," "1" and "1" in the first speed, "0," "1" and "1" in the second speed, "0," "0" and "1" in the third speed, and "0," "0" and "0" in the fourth speed, respectively. In order to energize and de-energize the solenoids in the manner shown in Table 3 by these output signals, an inverter 380 and an AND gate 390 are provided in the automatic shift control means 300' as seen in FIG. 17. The output signal of the 1-2 shift point computer 330' is inverted by the inverter 380, and the inverted signal and the output signal of the 3-4 shift point computer 370 are applied to the AND gate 390, the output signal of the AND gate 390 being amplified by an amplifier 350 to energize the second solenoid 132, while the output signal of the 2-3 shift point computer 340' is applied directly to an amplifier 360 to be amplified thereby for energizing the third solenoid 142. As is commonly known, an inverter delivers "0" and "1" in response to the application of "1" and "0" respectively, and an AND gate delivers "1" only when a plurality of inputs thereto are all "1." It is thus apparent that the solenoids can be energized and de-energized in the relation satisfying Table 3 by the above arrangement.

In addition to the application to a four-forward speed and one-reverse speed automatic transmission employing two multiple disc clutches and three brake bands as first, second and third brake bands 34, 36 and 38 in the latter are replaced by a third, first, a second and a third multiple disc brake 34', 36' and 38', respectively. These clutches cooperate with the first and second clutches 30 and 32 in exactly the same manner as the corresponding elements in the transmission shown in FIG. 14 to provide various speed ratios. However, the multiple disc brakes cannot be controlled in the manner with which the brake bands are controlled. In the case of the brake band, hydraulic servo chambers are provided on the apply side and release side thereof so that the brake band can be released by the force of a return spring when fluid under pressure is equally supplied to the apply-side and release-side hydraulic servo chambers. Thus, the hydraulic actuating system for supplying fluid under pressure to the hydraulic servo chambers for the clutches and brakes in the transmission shown in FIG. 18 differs slightly in structure from the hydraulic actuating system shown in FIG. 15.

The hydraulic actuating system preferably used for the transmission shown in FIG. 18 has a structure as shown in FIG. 19. The hydraulic actuating system consists of a fluid pressure source 100 and a hydraulic actuating circuit 110''' and like reference numerals are used to denote like parts appearing in FIG. 15. The hydraulic actuating circuit 110''' comprises three shift control valve menas 120''', 130''' and 140''' which include a first shift valve element 121''', a second shift valve element 131''' and a third shift valve element 141''', and a first solenoid 122''', a second solenoid 132''', and a third solenoid 142''', respectively. The solenoids 122''', 132''' and 142''' are energized and de-energized in the entirely same manner as those shown in Table 3 and fluid under pressure is selectively supplied to the hydraulic servo chambers for the clutches and brakes to provide various speed ratios.

Neutral — All the solenoids 122''', 132''' and 142''' are de-energized. In this state, fluid under pressure in a fluid passage 150 is supplied solely to the hydraulic servo chamber for the third brake 38' through the first shift control valve means 120''' and a fluid passage 191 thereby engaging the brake 38'. However, the output shaft 18' is not rotated since no driving force is transmitted from the turbine shaft 5.

First speed — The first and third solenoids 122''' and 142''' are energized. In this state, the fluid passage 150 communicates through the first shift control valve means 120''' with a fluid passage 190 leading to the hydraulic servo chamber for the first clutch 30 to supply fluid under pressure solely to this servo chamber thereby engaging the first clutch 30 to provide the first speed.

Second speed — All the solenoids 122''', 132''' and 142''' are energized. In this state, the fluid passage 150 communicates through the first shift control valve means 120''' with the fluid passage 190 leading to the hydraulic servo chamber for the first clutch 30 to supply fluid under pressure to this servo chamber for engaging the first clutch 30, and at the same time, communicates through the fluid passage 190 and the second shift control valve means 130''' with a fluid passage 193, thence through the third shift control valve means 140''' with a fluid passage 194 leading to the hydraulic servo chamber for the second brake 36' to supply fluid under pressure to this servo chamber thereby engaging the second brake 36' to provide the second speed.

Third speed — The first and second solenoids 122''' and 132''' are energized. In this state, fluid under pressure is supplied to the hydraulic servo chamber for the first clutch 30 to engage this clutch 30. Fluid under pressure is supplied further through the second shift control valve means 130''', the fluid passage 193 and the third shift control valve means 140''' to a fluid passage 195 leading to the hydraulic servo chamber for the first brake 34' to engage this brake 34' thereby providing the third speed.

Fourth speed — The first solenoid 122''' is solely energized. In this state, fluid under pressure is supplied to the hydraulic servo chamber for the first clutch 30 to engage this clutch 30. Fluid under pressure is also supplied through a fluid passage 192, the third shift control valve means 140''', a fluid passage 196 and the second shift control valve means 130''' to a fluid passage 197 leading to the hydraulic servo chamber for the second clutch 32 to engage this clutch 32 thereby providing the fourth speed.

Reverse — The third solenoid 142''' is solely energized. In this state, fluid under pressure is supplied to the fluid passage 191 leading to the hydraulic servo chamber for the third brake 38' to engage this brake 38'. Fluid under pressure is supplied further through a fluid passage 198, the third shift control valve means 140''', the fluid passage 196 and the second shift control valve means 130''' to the fluid passage 197 leading to the hydraulic servo chamber for the second clutch 32 to engage this clutch 32 thereby establishing the reverse driving condition for the vehicle.

It will be understood from some embodiments of the present invention above described by way of example, that the present invention is featured by the fact that it does not employ a manual valve priorly used for setting the shift regions but employs a plurality of shift control valve means which are electrically controlled by manual shift control means and/or automatic shift control means.

The present invention is in no way limited to such specific embodiments and many changes and modifications may be made therein without departing from the scope of the appended claims.

I claim:

1. In an automatic transmission for a vehicle having a hydraulic torque converter, a gear unit and a plurality of frictional engaging means each equipped with fluid pressure operated servo means for accomplishing the selective meshing engagement of the gears in said gear unit, a shift control system comprising:
   a source of fluid pressure;
   a hydraulic actuating circuit including a plurality of solenoid operated valve means less in number than said frictional engaging means and connecting said fluid pressure source to said fluid pressure operated servo means for controlling fluid under pressure supplied to said fluid pressure operated servo means;
   manual shift control means including electrical switch means having a plurality of switching positions for producing a variety of combinations of energization and de-energization of said solenoid operated valve means; and
   automatic shift control means actuated in a specific position of said manual shift control means to control the energization and de-energization of said solenoid operated valve means in response to electrical signals responsive to the driving conditions of the vehicle.

2. In a multi-forward speed and one-reverse speed automatic transmission for a vehicle having a hydraulic torque converter, a gear unit and more than three frictional engaging means each equipped with fluid pressure operated servo means for accomplishing the selective meshing engagement of the gears in said gear unit, a control system comprising:
   a source of fluid pressure;
   a hydraulic actuating circuit having three solenoid operational valve means connecting said fluid pressure source to said fluid pressure operated servo means for controlling fluid under pressure supplied to said fluid pressure operated servo means;
   manual shift control means including electrical switch means for controlling the energization of said solenoid operated valve means so as to set said transmission at either the neutral position, the reverse position or a plurality of forward positions including an automatically shifted forward position; and
   automatic shift control means actuated in said automatically shifted forward position of said transmission to control the energization of said solenoid operated valve means in response to electrical signals responsive to the driving conditions of the vehicle for producing a plurality of forward drive speed ratios.

3. In a forward multispeed and a single reverse speed automatic transmission for vehicles comprising a gear shift mechanism and engaging means with hydraulic servo means for accomplishing gear shifting of said gear shift mechanism, a control system comprising:
   a hydraulic pressure source;
   a hydraulic actuating circuit including three solenoid operated fluid passage switching valves and fluid passages interconnecting said three solenoid operated fluid passage switching valves, for setting states of hydraulic pressure supply from said hydraulic pressure source to said hydraulic servo means of said engaging means according to eight combinations of energization and deenergization of said solenoids to thereby establish in said gear shift mechanism all gear positions including a neutral position and a reverse drive position;
   an electric power source;

manual speed change control means comprising an electric switch having a plurality of shift positions for controlling the connection between said electric power source and each of said solenoids for establishing in said gear shift mechanism at least the neutral position and reverse drive position; and automatic speed change control means disposed between said electric power source and said solenoids for determining the energization or deenergization of each of said solenoids in response to a running state of a said vehicle to establish in said gear shift mechanism therefor each of said forward drive positions.

4. A control system according to claim 3, in which said manual speed change control means has a shift position for setting automatic speed change and said automatic speed change control means is capable of energizing said solenoids only in said shift position.

5. A control system according to claim 4, in which said manual speed change control means connects said electric power source to said automatic speed change control means only in said shift position for setting automatic speed change.

6. A control system according to claim 4, further comprising an electromagnetic relay which is closed only in said shift position for setting automatic speed change to connect said automatic speed change control means to said solenoids.

7. A control system according to claim 4, in which said manual speed change control means has, in addition to said neutral position, said reverse drive position and said shift position for setting automatic speed change, shift positions for setting said forward drive positions, respectively.

8. A control system according to claim 3, in which said hydraulic actuating circuit sets a hydraulic pressure supply state to establish said neutral position in said gear shift mechanism when all of said three solenoids are in a deenergized state and said manual speed change control means cuts the connection between said electric power source and all of said solenoids when said manual speed change control means is in the shift position for setting the neutral position.

9. A control system according to claim 3, in which said hydraulic actuating circuit establishes in said gear shift mechanism the neutral position and reverse drive position, when a first solenoid of said three solenoids is in a deenergized state, in accordance with combination of energization and deenergization of the other two solenoids, and sets a hydraulic pressure supply state to establish in said gear shift mechanism each of said forward drive positions, when said first solenoid is in an energized state, in accordance with the combination of energization and deenergization of the other two solenoids.

10. In three forward speed and a single reverse speed automatic transmission for vehicles comprising a gear shift mechanism and engaging means with hydraulic servo means for accomplishing gear shifting of said gear shift mechanism, a control system comprising:

a hydraulic pressure source;

a hydraulic actuating circuit including three solenoid operated fluid passage switching valves and fluid passages interconnecting said three solenoid operated fluid passage switching valves, for setting states of hydraulic pressure supply from said hydraulic pressure source to said hydraulic servo means of said engaging means to establish in said gear shift mechanism a neutral position and a reverse drive position, when a first solenoid is in a deenergized state, in accordance with the combination of energization and deenergization of the other two solenoids and to establish therein each of three forward drive positions, when said first solenoid is in an energized state, in accordance with the combination of energization and deenergization of the other two solenoids;

an electric power source;

manual speed change control means disposed between said electric power source and said three solenoids and comprising an electric switch having shift positions for setting in said gear shift mechanism a neutral position, reverse drive position, first forward drive position, second forward drive position and automatic speed change position, respectively; and automatic speed change control means disposed between said electric power source and said solenoids for determining energization or deenergization of said solenoids to cause said gear shift mechanism to perform automatic speed change control between the first and third forward drive positions in response to a running state of a vehicle when said manual speed change control means is in the shift position for setting automatic speed change.

11. A control system according to claim 10, in which said manual speed change control means places said first solenoid in a deenergized state in the shift positions for setting the neutral and reverse drive positions and places the same in an energized state in the other shift positions, and said automatic speed change control means performs automatic speed control by determining energization and deenergization of the two solenoids other than said first solenoid.

12. In a four forward speed and a single reverse speed automatic transmission for vehicles comprising a gear shift mechanism and engaging means with hydraulic servo means for accomplishing gear shifting of said gear shift mechanism, a control system comprising:

a hydraulic pressure source;

a hydraulic actuating circuit including three solenoid operated fluid passage switching valves and fluid passages interconnecting said three solenoid operated fluid passage switching valves, for setting states of hydraulic pressure supply from said hydraulic pressure source to said hydraulic servo means of said engaging means thereby to establish in said gear shift mechanism a neutral position and a reverse drive position, when a first solenoid is in a deenergized state, in accordance with the combination of energization and deenergization of the other two solenoids and to establish therein each of four forward drive positions, when said first solenoid is in an energized state, in accordance with the combination of energization and deenergization of the other two solenoids;

an electric power source;

manual speed change control means disposed between said electric power source and said three solenoids and comprising an electric switch having shift positions for setting in said gear shift mechanism a neutral position, reverse drive position, first forward drive position, second forward drive position, third forward drive position and automatic speed change position, respectively, and for placing at least said first solenoid in a deenergized state in the shift positions for setting the neutral and reverse drive positions and placing at least said first solenoid in an energized state in the other shift positions; and automatic speed change control means disposed between said electric power source and the two solenoids other than said first solenoid for determining energization or deenergization of said two other solenoids to cause said gear shift mechanism to perform automatic speed change control between the first and fourth forward drive positions in response to a running state of a vehicle when said manual speed change control means is in the shift position for setting automatic speed change.

13. In an automatic transmission for a vehicle having a hydraulic torque converter, a gear unit and a plurality of frictional engaging means for accomplishing the selective meshing engagement of the gears in said gear unit, a shift control system comprising:

a source for supplying pressurized fluid;

a hydraulic actuating circuit including fluid passage switching valves for distributing the pressurized fluid selectively to said friction engaging means, and a plurality of solenoids for controlling actuation of the fluid passage switching valves, the number of said solenoids being less than that of said engaging means;

an automatic shift control means connected in circuit with said solenoids for controlling the operation of the designated solenoids in response to the driving conditions of the vehicle; and a manual shift control means connected in circuit with said solenoids and said automatic shift control means, said manual shift control means having a plurality of switches for controlling the operation of the designated solenoids in response to each actuation of the same, at least one of said plurality of switches serving to operate said automatic shift control means.

* * * * *